United States Patent
Brousseau, Ing. et al.

(10) Patent No.: US 10,311,502 B1
(45) Date of Patent: Jun. 4, 2019

(54) SYSTEM FOR LIMITING AND CONTROLLING ACCESS TO LIMITED RESOURCES OVER A NETWORK

(75) Inventors: Jean-Francoys Brousseau, Ing., St-Bruno (CA); Richard Drolet, Quebec (CA); Paul Deshaies, Granby (CA); Vadim Gubergrits, Brossard (CA); Keith Kelly, Encinatas, CA (US)

(73) Assignee: OUTBOX TECHNOLOGY CRB INC., Montreal, Quebec (CA)

( * ) Notice: Subject to any disclaimer, the term of this patent is extended or adjusted under 35 U.S.C. 154(b) by 369 days.

(21) Appl. No.: 12/584,421

(22) Filed: Sep. 4, 2009

(51) Int. Cl.
*G06Q 30/00* (2012.01)
*G06Q 30/06* (2012.01)
*G06Q 10/02* (2012.01)
*G06Q 10/06* (2012.01)

(52) U.S. Cl.
CPC ......... *G06Q 30/0641* (2013.01); *G06Q 10/02* (2013.01); *G06Q 10/063* (2013.01); *G06Q 30/06* (2013.01); *G06Q 30/0613* (2013.01)

(58) Field of Classification Search
CPC ...... G06Q 30/00; G06Q 10/02; G06Q 10/063; G06Q 30/06; G06Q 30/0601; G06Q 30/0613; G06Q 30/0641
USPC .................................. 705/26, 27, 26.1, 27.1
See application file for complete search history.

(56) References Cited

U.S. PATENT DOCUMENTS

| | | | |
|---|---|---|---|
| 6,047,268 A * | 4/2000 | Bartoli et al. ................. | 705/35 |
| 7,110,960 B2 | 9/2006 | Phillips et al. | |
| 7,174,370 B1 * | 2/2007 | Saini et al. .................... | 709/220 |
| 7,194,418 B2 | 3/2007 | Smith | |
| 7,925,247 B2 * | 4/2011 | Rao ........................ | H04L 67/125 455/418 |
| 8,078,483 B1 * | 12/2011 | Hirose .................... | G06Q 10/02 705/1.1 |
| 8,176,177 B2 * | 5/2012 | Sussman .................... | G06F 9/50 709/225 |
| 8,255,288 B1 * | 8/2012 | Gupta .................... | G06Q 30/06 705/26.1 |

(Continued)

OTHER PUBLICATIONS

"Node Status Algorithm for Load Balancing in Distributed Service Architectures at Paperless Medical Institutions," by Rajasvaran Logeswaran and Li-Choo Chen, J Med Syst (2008) 32: 453-461.*

(Continued)

*Primary Examiner* — Anne M Georgalas
(74) *Attorney, Agent, or Firm* — Betsy Kingsbury Dowd; BKDowd Law, P.C.

(57) ABSTRACT

A system and method are provided to control access of a plurality of remote terminals to one or more service(s). A first server receives requests to access the services(s) from the plurality of terminals. In response the first server provides a terminal program to the terminals to control further communication between the terminals and first server. This enables substantial data to be stored on a user's terminal rather than on the first server, thereby reducing the data load on the first server. Each terminal runs at a pace set by its interaction with the server and thus operates asynchronously from the other terminals and the first server. A second server, operable after the first, provides the services. The terminal program initiates communication between the terminals and the first server, which selectively redirects the terminals to connect to the second server for accessing the service(s).

9 Claims, 4 Drawing Sheets

BLOCK DIAGRAM

(56) References Cited

U.S. PATENT DOCUMENTS

| | | | |
|---|---|---|---|
| 8,484,058 B2 * | 7/2013 | Benson et al. | 705/5 |
| 2002/0099831 A1 * | 7/2002 | Tsunogai | H04L 67/14 |
| | | | 709/227 |
| 2003/0093430 A1 * | 5/2003 | Mottur | H04N 5/23203 |
| 2004/0006516 A1 * | 1/2004 | Anagol-Subbarao et al. | |
| | | | 705/26 |
| 2005/0071245 A1 * | 3/2005 | Norins, Jr. | G06Q 10/02 |
| | | | 705/14.35 |
| 2005/0089053 A1 * | 4/2005 | Zhu | H04M 3/5191 |
| | | | 370/412 |
| 2007/0088616 A1 | 4/2007 | Lambert et al. | |
| 2007/0136112 A1 | 6/2007 | Sussman et al. | |
| 2007/0233291 A1 * | 10/2007 | Herde | G06Q 10/02 |
| | | | 700/91 |
| 2007/0244731 A1 * | 10/2007 | Barhydt | G06Q 10/02 |
| | | | 705/5 |
| 2007/0245351 A1 | 10/2007 | Sussman et al. | |
| 2007/0265892 A1 | 11/2007 | Valentino | |
| 2008/0133283 A1 * | 6/2008 | Backer | G06Q 10/02 |
| | | | 705/5 |

OTHER PUBLICATIONS

"Agents in E-Commerce: State of the Art," by Minghua He and Ho-fung Leung, Knowledge and Information Systems (2002) 4: 257-282 (Year: 2002).*

* cited by examiner

Phase A

Phase B

Phase C

SYSTEM FOR LIMITING AND CONTROLLING ACCESS TO LIMITED RESOURCES OVER A NETWORK

FIELD OF THE INVENTION

This invention relates to a system to control access of a large number of remote potential users connected to a limited resource through a network and particularly to one in which the demand is likely to be greater than the supply.

BACKGROUND OF THE INVENTION

Sales of tickets for large live events, such as a concert for popular artists or certain sporting events are often events with a very high demand so that the demand can be overwhelmingly greater than the tickets available. Examples of such events are World Series games where 50,000 tickets are available while the demand is in the millions and a concert for a popular headliner performing in a venue offering 15,000 seats, whilst the demand is in the 100,000's.

In an attempt to give all those who wish to buy tickets an equal chance to buy tickets it is common for a specific time to be set for the beginning of the sale of tickets. While this approach is fair to those who want tickets, it often creates a "stampede" when the specific time arrives or creates long lines hours before the event ticket sales begins.

The process for ticket sales is further complicated by the fact that different priced tickets are on sale for different seats. In addition one seat within a price category can be more desirable than another.

There are various methods which have been used or suggested in the past for selling seats to an event in which the demand is greater than the supply for tickets. It is usual that the tickets are sold at many locations to accommodate the large area that potential buyers come from and to also not have hundreds of thousands of potential customers gather at a single location. In one method some form of sequentially numbered identifying object, such as a bracelet, is distributed to potential consumers well in advance of ticket sales, for example, days or weeks before. The potential customers are instructed to show up at a specified sales location shortly before the tickets are to be sold, for example one hour. A "starting number" is randomly picked at each location and the potential customers at each location are physically lined-up in numerical order, starting with the potential customer with the randomly drawn starting number. He or she becomes the first customer. Using this method there is no advantage in showing up early, since each numbered identifying object has the same chance of being first in line. This gives a perception of fairness, since the right to purchase tickets early in the sales process is set up by a lottery.

Attempts have been made to sell tickets for these events on-line, over the internet or the like. The positive features of the prior process have not been used, but rather these internet systems focus primarily on the advantage of the scalability of internet systems and computing power so as to be able to handle the large demand expected. The demand is still typically greater than the capacity of these systems and there is a risk of overwhelming these systems and this, indeed, regularly occurs.

In addition, demand is typically greater than the number of seats to be sold, and users keep trying to gain access to the service until seats are completely sold out, at which point some users can never access the seats. Access to the service is generally controlled randomly and no information on the progress of the sales is communicated to the user. This process can be very inefficient, and frustrating to potential customers.

SUMMARY OF THE INVENTION

In order to overcome the problems of the prior art, the present invention provides a system for controlling access of a plurality of remote terminal devices associated with a plurality of potential users of one or more web services in which a large number of the plurality of remote terminal devices attempt to access the one or more web services in a short period of time. A first apparatus receives requests for access to the one or more web services from a plurality of the plurality of remote terminal devices. In response to the requests the first apparatus provides a remote terminal device program to the remote terminal devices to control further communication between the remote terminal devices and the first apparatus. This provides an interaction between the first apparatus and the remote terminal device program to enable substantial amounts of data to be stored on the user's computer rather than having it stored on the first apparatus, which would put most of the data load on the first apparatus. In addition, each remote terminal device can run at a pace set by an interaction of the first apparatus and the remote terminal devices so that each remote terminal device can operate asynchronously from others and the first apparatus. A second apparatus, operable after the first apparatus, provides the one or more web services. The remote terminal device program initiates communication between the remote terminal devices and the first apparatus. The first apparatus organizes each remote terminal device into groups and selectively redirects the remote terminal devices to connect to the second apparatus on a group basis at the appropriate time as described below.

In some embodiments the first apparatus will randomly organize the plurality of remote terminal devices into groups. The first apparatus may also rank the groups amongst themselves. In another embodiment the first apparatus redirects the remote terminal devices to the second apparatus on a ranked group basis.

In yet another embodiment, the first apparatus obtains information from the plurality of the remote terminal devices prior to redirecting the remote terminal devices to the second apparatus and forwards at least some of the information to the second apparatus.

In some embodiments the first or second apparatus provides information to one or more of the plurality of remote terminal devices relating to one or more parameters with respect to group access to the second apparatus, such as, for instance, expected wait time to be redirected, product availability or new product offerings.

DETAILED DESCRIPTION OF THE INVENTION

Figure 1:
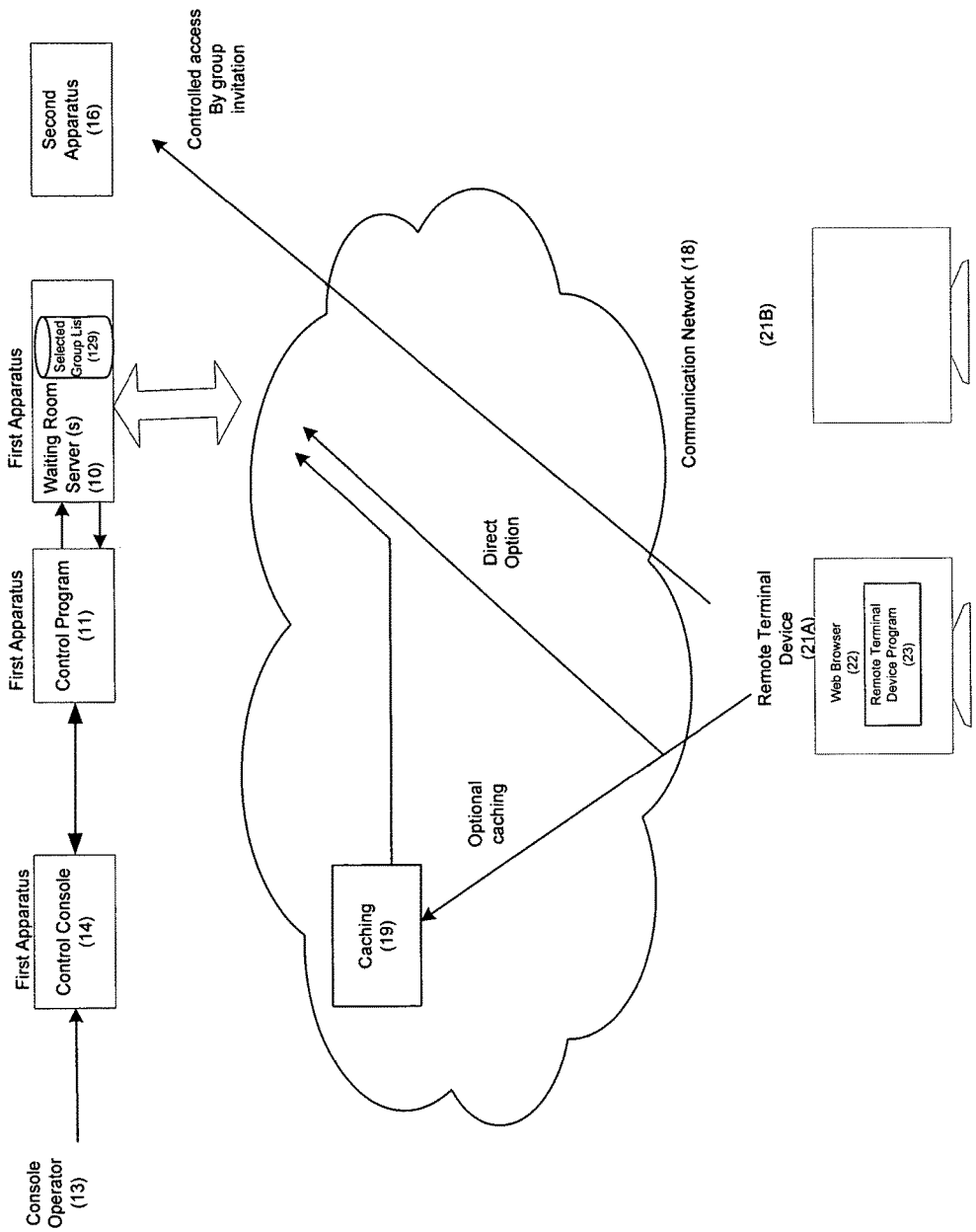
FIG. 1 is a block diagram of one embodiment of the system of this invention.

FIG. 1 depicts one embodiment of this invention. In this system a plurality of remote terminal devices 21A, 21B, etc, typically thousands at various locations are connected to a communications or other network 18 such as the internet. The remote terminal devices 21A, 21B, etc can be different types of devices such as PC's, wired or wireless telephones, as well as any other network interface device or application. Other apparatuses are also connected to the network 18, including apparatuses which we will refer to as the First apparatus 10 and the Second apparatus 16. First apparatus 10 and the Second apparatus 16 include functional programs that may be on one or more servers and are located remote from the plurality of remote terminal devices 21A, 21B, etc. In some embodiments of this invention a cache 19 is also employed which can be located at various locations and connected to the network.

Typically, each remote terminal device 21 will run a browser program 22 to communicate over the network. When the browser program 22 initially accesses the First apparatus 10, a remote terminal device program 23 will be downloaded to the browser program 22 to communicate with the First apparatus 10. Once downloaded to the browser program 22, the remote terminal device program 23 begins to regularly interrogate the First apparatus 10 as to its status.

The use of a remote terminal device program 23 enables an interaction between First apparatus 10 and remote terminal device program 23 enabling substantial amounts of data to be transferred to and stored on the remote terminal device 21 rather than on the First apparatus 10, in which case most of the data load would be on the First apparatus 10. In addition, each remote terminal device 21 can run at a pace set by an interaction of the First apparatus 10 and the remote terminal devices 21 so that each remote terminal device 21 can operate asynchronously from others and the First apparatus 10. The First apparatus 10 can be in one of three different time periods (or "phases") that allow full control of the First apparatus and access to the Second apparatus. These phases shall be referred to as Phase A, Phase B and Phase C.

A cache 19 may also be used to increase the capacity of the system to handle an even larger number of simultaneous remote terminal devices. In one embodiment of this invention, the caching mechanism is implemented by using third-party caching services over the Internet. Such services will duplicate and copy for quick access First apparatus 10 responses according to a set of rules relating to the time for which the response will be valid, and the nature of the responses to be duplicated. This invention can also dramatically increase the capacity of the First apparatus 10 by making very efficient use of this apparatus through grouping of remote terminal devices.

While in operation, the system can be implemented with two or more phases. We shall discuss the operation as a three-phase system and will thereafter discuss how only two phases can be implemented.

Phase A

Phase A is the period of time prior to the time the web service is to be offered by making the Second apparatus accessible. During this phase only the remote terminal devices 21A, 21B, etc and First apparatus 10 are used. This is a period when remote terminal devices set up and prepare for their participation in later actions of the system and to receive information from the First apparatus during this phase. As will be seen these functions will continue during later phases but other functions and apparatus will be also used.

Figure 2:
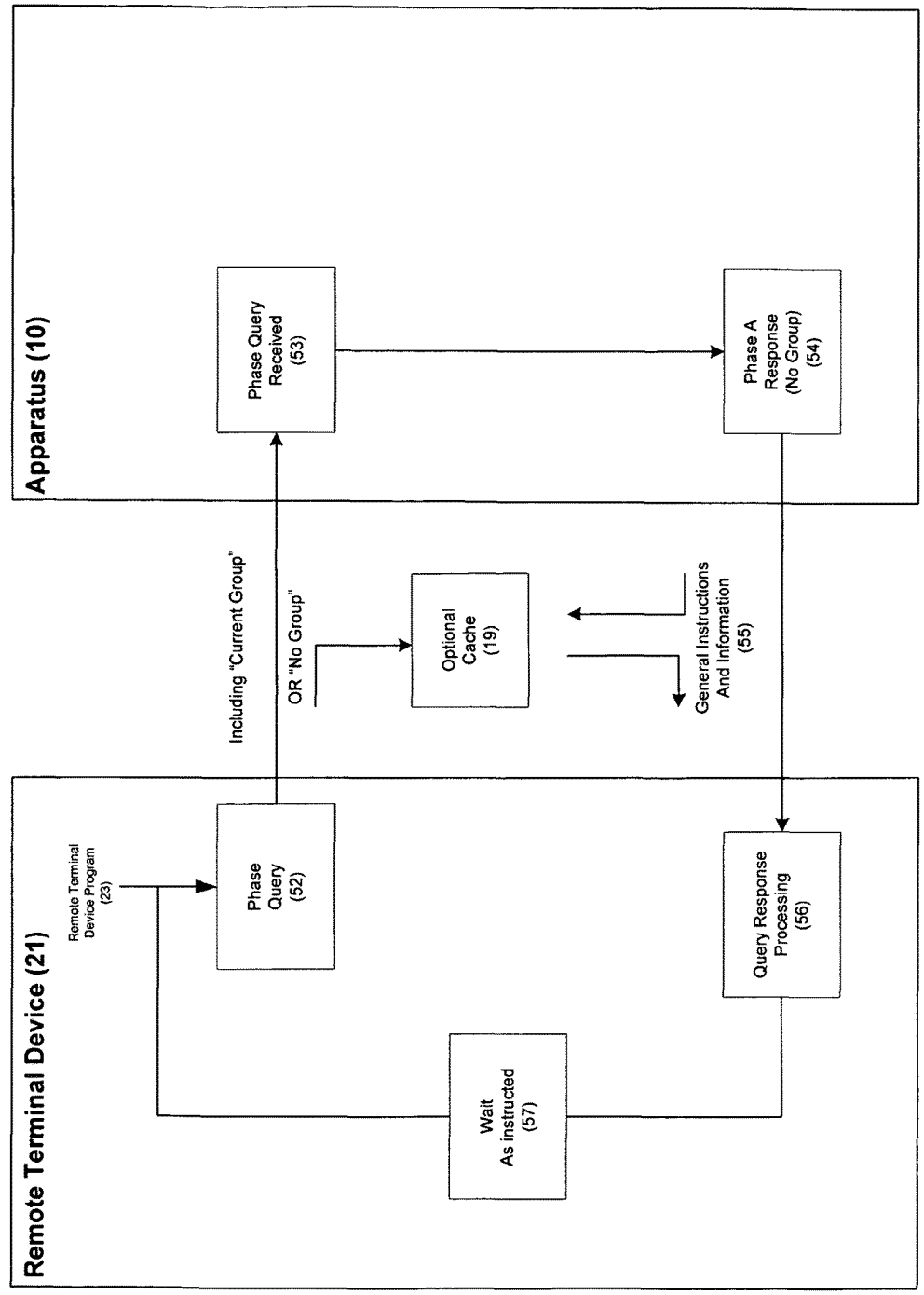
FIG. 2 is a flow chart showing the operation of Phase A of the method of this invention.

FIG. 2 shows the flow of information between the remote terminal devices 21A, 21B, etc and First apparatus 10. Once the remote terminal device program 23 is loaded into the remote terminal devices 21A, the remote terminal device program 23 sends a phase query 52 to First apparatus 10 and is received as phase query received 53.

A response 54, 55 is returned to the remote terminal device program 23 and processed 56. The response contains instructions on the First apparatus 10 status, operational parameters such as the frequency of such future queries and general information on the product or services to be offered through the Second apparatus. The remote terminal device program 23 will continue sending various queries 52 to the First apparatus 10 according to the frequency specified in previous queries and the stage of operation the remote terminal device program 23 has reached, until a change in phase is initiated (see FIG. 2, "wait as instructed" 57). If First apparatus 10 is no longer in "Phase A" but in a later phase instead, First apparatus 10 response will contain the information regarding the actual Phase it is in, and the remote terminal device program 23 will synchronize to that phase (see other phase descriptions below).

In a variation of this embodiment, a cache 19 may be introduced to reduce the number of remote terminal device queries actually reaching First apparatus 10 by providing a large number of remote terminal devices 21A, 21B, etc with a copy of the response retrieved by a previous query by a remote terminal device from cache 19 instead. This response can be efficiently stored in the cache because of the structure and nature of the query requests and responses.

Phase B

Phase B is the period of time prior to the time the product and/or services are made available by the Second apparatus, but during which remote terminal devices 21A, 21B, etc. will be required to register with the system to be assigned a group number. This group number is stored on the respective remote terminal device 21 and not stored by the First apparatus 10. During different times of the operation of this system individual user information is provided by the First apparatus 10 and stored on the respective remote terminal device 21 to relieve the storage burden on the First apparatus 10. No session is set up between the First apparatus 10 and the remote terminal devices 21 since all necessary information is stored on the remote terminal device 21. This also relieves the burdening of the resources on the First apparatus 10. The primary purpose of Phase "B" is therefore to divide remote terminal devices 21 into groups, and continue to provide up-to-date product and/or services and apparatus phase information. Phase B can be initiated under operator control 13 using the First apparatus Control Console 14 or through a preprogrammed algorithm in the First apparatus Control program 11. While a multitude of remote terminal device programs 23 continue to communicate with First apparatus 10, they will now receive appropriate instructions as discussed below depending on the state of the remote terminal device program 23 in that remote terminal device 21. In this way the First apparatus 10 keeps track of its own phase status, while each remote terminal device program 23 keeps track of the status of its associated remote terminal device 21A, 21B, etc. In this way the First apparatus 10 is relieved of the burden of tracking the potentially thousands of remote terminal devices 22. In addition the thousands of remote terminal devices 21A, 21B, etc can operate asynchronously of each other in each phase of the First apparatus 10 without the First apparatus 10 necessarily being involved. In addition the asynchronous operation of the remote terminal devices 22 randomizes the time each remote terminal device asks to register and receive a group number preventing the stampede of requests to the First apparatus 10 as in past systems.

In this embodiment, a multitude of remote terminal devices 21A, 21B, etc may have already connected to the First apparatus 10 during Phase A, or could be "newcomers" connecting to the First apparatus 10 for the first time. All remote terminal devices 21A, 21B, etc are initially not registered with any group and presented with the same information 55. During this Phase B, in response to query messages from these unregistered remote terminal device programs, the remote terminal device program 23 will be instructed to register to receive a group number 29 and synchronize its phase to the current phase of the First apparatus.

Figure 3:
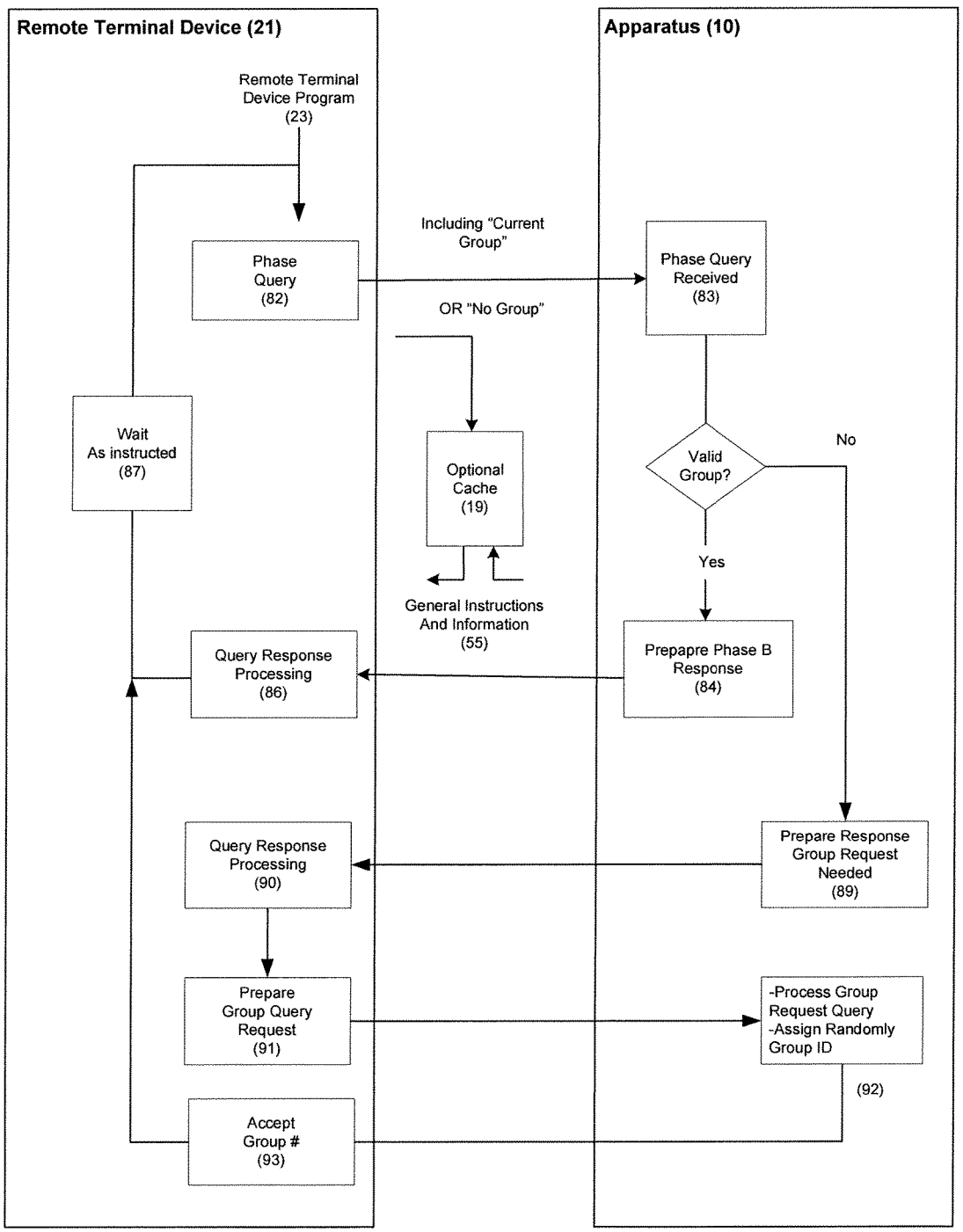
FIG. 3 is a flow chart showing the operation of Phase B of the method of this invention.

FIG. 3 describes the flow of information between the remote terminal device program 23 and the First apparatus 10 during Phase B. If the remote terminal device 21 A, 21B, etc connects for the first time during Phase B, remote terminal device program 23 is loaded into the remote terminal device 21, and the associated remote terminal device program 23 immediately sends a query 82 to the First apparatus 10. Because First apparatus 10 is currently in Phase B, when the query is received 83 by First apparatus 10, a request to register 89 is returned by First apparatus 10 in response to the queries 90 received from each remote terminal device program 23. This will trigger the registration process 91, during which each remote terminal device program 23 will request a group assignment 92 from First apparatus 10. As part of the preparation for the registration process 91 for receiving a group number 93, a number of intermediate steps can be optionally implemented to verify remote terminal device identity, verify continued remote terminal device presence, or introduce a built-in randomized delay.

Such remote terminal device program 23 will then resume sending queries 82 to the First apparatus 10 and process responses 86 according to the frequency specified in the last query response 84 from First apparatus 10 or cache 16, until a change in Phase is noted (see FIG. 3, "wait as instructed 87"). If the First apparatus 10 is no longer in Phase "B" but in a different phase instead, First apparatus 10 responses will contain the information regarding the actual phase it is in, and the remote terminal device program 23 will synchronize to that phase (see other phase descriptions).

Another substantial benefit of this invention is that First apparatus 10 can track the number of individual registration requests received, and provide control Operator 13 with valuable information as to the number of remote terminal devices 21A, 21B, etc. registered. This will allow for appropriate adjustments to optimize the products and/or services to be offered through the Second apparatus 16.

Another substantial benefit of this invention is that responses sent by the First apparatus to remote terminal device programs 23 are group-specific once group number assignments are made, and not specific to each remote terminal device 21A, 21B, etc. This has the effect of reducing the number of responses to be sent by First apparatus 10 in inverse proportion to the group size.

In a variation of this invention, a cache 19 may be introduced to reduce the number of remote terminal device programs 23 actually polling the First apparatus 10 by providing a large number of remote terminal device programs 23 with a copy of the response retrieved from cache 19 instead of directly from First apparatus 10.

In another variation of this invention, other information can be collected by the remote terminal device program 23, and submitted by the remote terminal device program 23 to the First apparatus 10 for aggregation at the group level. Any changes to remote terminal device program's information can also be submitted as differential to the First apparatus 10 to update each group's statistics.

In another variation of this invention, an interactive application can be run by the remote terminal device program 23 to separate "human" users from robot programs, and thus prevent or reduce the ability of robot programs to submit queries to First apparatus 10.

In another variation of this invention, extensive "demand" information and analytics, based on pre-order information collected by remote terminal device programs 23 can be compiled based on each remote terminal device program's preferences and communicated to the Console operator 13 in real time.

Phase C

Phase C is the period of time that starts when access to the Second apparatus 16 is made available to some of the remote terminal device programs 23. It corresponds to the time at which products or services offered by the Second apparatus 16 become available. Referring again to FIG. 1, the primary purpose of Phase C is to control access to Second apparatus 16 by letting selected remote terminal device programs 23 connect to the Second apparatus 16, while continuing to provide up-to-date product and apparatus phase information to other remote terminal device programs 23, which continue to wait until their group is granted access to Second apparatus. Access to the Second apparatus 16 is granted based on Group membership, letting only remote terminal device programs 23 with a group registration within the selected Group(s) 129 (see FIG. 1) access the Second apparatus 16. The selected Groups for access may be ordered in a random manner. Phase C can be started, and gradual access granted to groups over time, under operator control 13 using the First apparatus Control Console 14. This process can also be triggered through a preprogrammed algorithm in the First apparatus Control program 11. While a multitude of remote terminal device programs 23 continue to communicate with First apparatus 10, they are given appropriate instructions, depending on the state of the remote terminal device program 23 in that remote terminal device 21. In this way the First apparatus 10 keeps track of its own phase status, while each remote terminal device program 23 keeps track of the status of its associated remote terminal device 21. In this way the First apparatus is relieved of the burden of tracking the potentially thousands of remote terminal devices 21A, 21B, etc. In addition the thousands of remote terminal devices 21A, 21B, etc can operate asynchronously of each other in each phase of the First apparatus 10 without the First apparatus 10 being involved.

Refer again to FIG. 1, for a detailed description of the components of Phase C. In this embodiment, a multitude of remote terminal devices 21A, 21B etc. could have already connected to First apparatus 10 during Phase A and B, or could be "newcomers" connecting to First apparatus 10 for the first time. All remote terminal devices 21A, 21B, etc are initially not registered with any group, and presented with the same information. Upon their first interaction with the First apparatus 10, in response to query messages from these unregistered remote terminal devices 21A, 21B etc, the remote terminal device programs 23 will have been instructed to register to receive a specific group number and synchronize their phase to that of the First apparatus 10, as described in Phase B.

Figure 4:
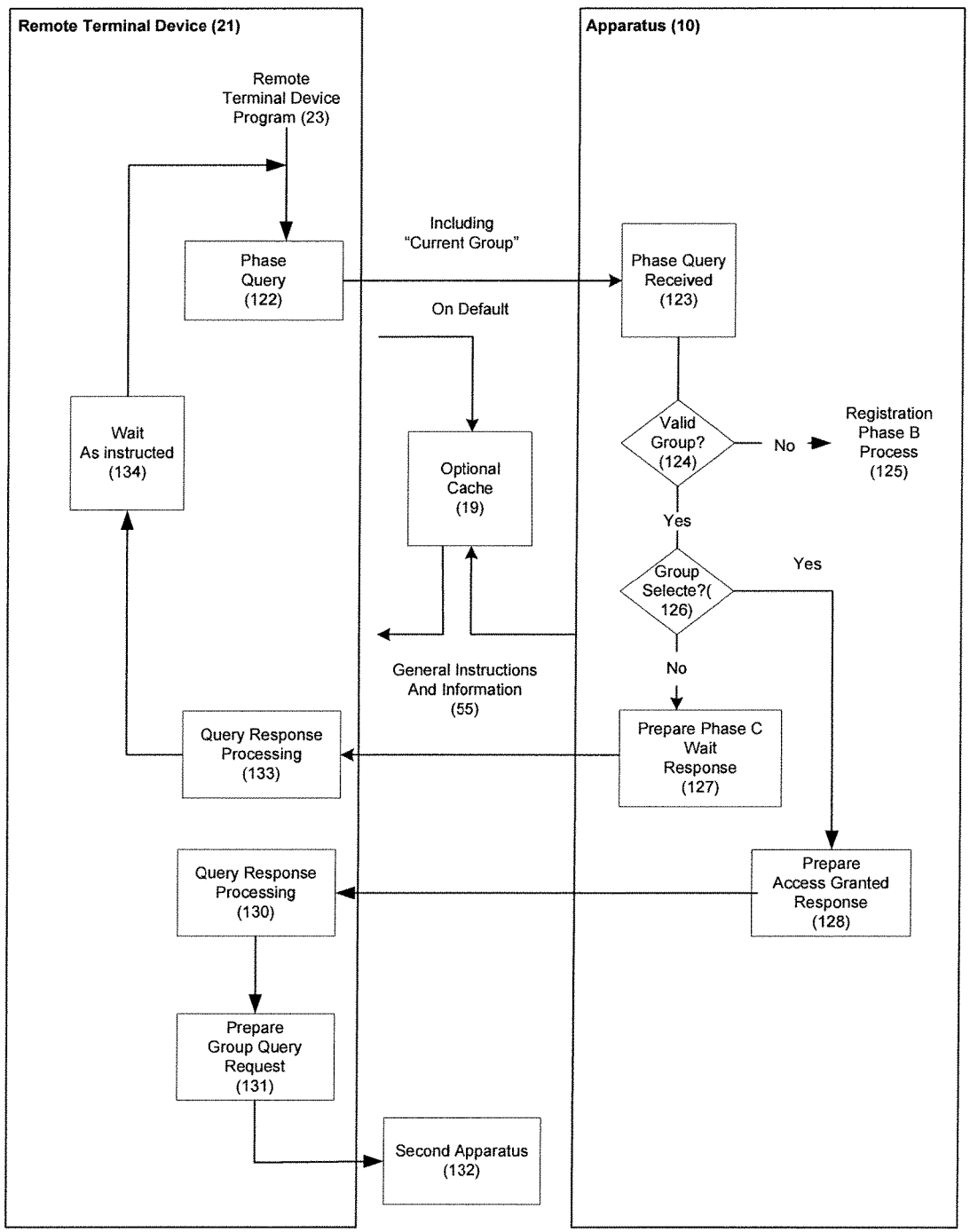
FIG. 4 is a flow chart showing the operation of Phase C of the method of this invention.

FIG. 4 describes the flow of information between the remote terminal device program 23 and First apparatus 10 during Phase C. Once the remote terminal device program 23 is loaded into each remote terminal device 21A, 21B, etc, the remote terminal device program 23 sends a query 122 which is received and processed 123 by the First apparatus 10. If the remote terminal device program 23 has not registered during the previous phases, it will not be in possession of a valid Group number 124, and will be instructed to register 125 using the pre-described process (see Phase B).

Assuming that the First apparatus 10 is in Phase C, the First apparatus 10 will receive queries from the multitude of remote terminal device programs 23A, 23B, etc, and determine if the Group received from each remote terminal device program 23 is part of the selected Group(s) 126, 129. Such selection is under the control of Console Operator 13 at First apparatus control Console 14 or, alternatively, is under the automated control of the First apparatus control by virtue of a preprogrammed algorithm 11. The purpose of this control is to limit the access to the Second apparatus 16 to an acceptable number of remote terminal devices 21A, 21B, etc. Such number will depend on the performance and capacity of the Second apparatus 16 resources, and will be monitored by the console Operator 13 or the Control program 11 to maintain optimal usage of the Second apparatus 16 resources.

For remote terminal device programs 23 that are not in possession of any of the selected Group number(s) 129, the First apparatus will return a group-specific response 127 containing instructions on First apparatus 10 phase status, expected wait time, operational parameters such as the frequency of such future queries and general information on the product and/or services currently offered. The remote terminal device program will process this information 133, and resume sending queries 122 to First apparatus 10 according to the frequency 134 specified in previous queries, until a change in phase is noted. If First apparatus 10 is no longer in Phase "C" but in a different phase instead, First apparatus 10 response will contain the information regarding the actual phase it is in, and the remote terminal device program 23 will synchronize to that phase (see other phase descriptions).

For remote terminal device programs 23 in possession of a Group number that is part of the selected Group number list 129, First apparatus 10 will return a group-specific response 128 containing specific instructions on how to access Second apparatus 16. Such instructions will trigger the initiation of the connection process 130,131 to Second apparatus 16. As part of the connection process 132, a number of intermediate steps can be optionally implemented to verify that the remote terminal device program 23 is in possession of the appropriate group number, that it was received through a legitimate process, etc.

In a variation of this invention, cache 19 may be introduced to reduce the number of remote terminal device programs 23 actually polling First apparatus 10 by providing a large number of remote terminal device programs 23 with a copy of the response retrieved from cache 19 instead.

In another variation of this invention, an interactive application can be run by the remote terminal device program 23 to separate human users from robot programs in First apparatus 10, and thus prevent or reduce the ability of robot programs to submit queries to First apparatus 10.

What is claimed is:

1. A system for controlling access of a plurality of remote terminal devices associated with a plurality of users requesting remote Internet access to on-line product-selling services during the same period of time, said system comprising:
    a plurality of remote terminal devices associated with a plurality of users requesting remote access to on-line product-selling services, each remote terminal device including a remote terminal device program;
    a first apparatus for receiving requests for remote access to said on-line product-selling services from said plurality of remote terminal devices via said remote terminal device programs; and
    a second apparatus configured to provide said on-line product-selling services;
    said first apparatus configured to:
        operate consecutively in a first phase, a second phase, and a third phase of operation, and to allow access to said second apparatus only during said third phase;
        change its operational phase in accordance with one of a preprogrammed control algorithm and input from a control console in communication with said first apparatus;
        receive queries as to its current operational phase from each said remote terminal device program and to return responses thereto, each said remote terminal device program being configured to send said queries and to process said responses in accordance with the current operational phase of said first apparatus;
        respond to said queries received during said first phase by providing information on said on-line product-selling services and the status of the current operational phase;
        pseudorandomly assign one of a plurality of groups, and return a group number corresponding thereto, to each of said remote terminal device programs that has not yet received a group assignment in response to each of said queries received therefrom that also includes a request to receive said group assignment, and that is received only during said second phase and said third phase,
        return group-specific responses to each of said queries that include said group number;
        only during said third phase, select one of said assigned groups as a selected group for redirecting said remote terminal devices in said selected group to said second apparatus based at least in part on a performance and capacity of resources of said second apparatus; and
        redirect one of said remote terminal devices in said selected group to said second apparatus only in response to receiving one of said queries that includes said selected group therefrom during said third phase, said on-line product-selling services on said second apparatus being accessible to said remote terminal devices only during said third phase and upon redirecting by the first apparatus thereto;
        wherein said first apparatus is further configured to track a total number of said plurality of remote terminal devices requesting to register to receive said group assignment; to adjust said on-line product-selling services and products offered based at least on said total number; and to forward updated information regarding said on-line product-selling services and said products offered to said remote terminal devices that have been assigned to one of said plurality of groups prior to redirecting said remote terminal devices to said second apparatus, wherein said updated information includes updated product availability and new product offerings.

2. The system of claim 1 in which said first apparatus selects a plurality of said assigned groups as selected groups for redirecting and also ranks said selected groups for redirecting said remote terminal devices in each selected group to said second apparatus.

3. The system of claim 1, wherein each remote terminal device program is configured to collect pre-order information associated with the plurality of users requesting remote access, and wherein said first apparatus obtains user information including said pre-order information from said remote terminal devices in one of said assigned groups prior to redirecting said remote terminal devices in said assigned group to said second apparatus and forwards at least some of said user information to said second apparatus.

4. The system of claim 1 wherein said updated information is provided by said first apparatus in said group-specific responses, and said updated information further includes an expected wait time to be redirected.

5. The system of claim 1 in which said on-line product-selling services are on-line ticket-selling services for an event and said products offered are tickets offered.

6. The system of claim 1 in which said first apparatus pseudorandomly selects said one of said assigned groups as said selected group for redirecting said remote terminal devices to said second apparatus, thereby pseudorandomly selecting the order in which said selected groups are redirected to said second apparatus.

7. The system of claim 1, in which each said group number returned to each of said remote terminal devices is stored on each of said remote terminal devices.

8. The system of claim 1, wherein said first apparatus is further adapted for sending operational parameters to said remote terminal device programs including a frequency parameter for defining a rate for sending said subsequent queries.

9. The system of claim 1, further comprising a cache for receiving said group-specific responses from said first apparatus and for providing each of said remote terminal devices within said corresponding group with copies of said group-specific responses.

\* \* \* \* \*